United States Patent [19]

Mukai et al.

[11] 4,013,340
[45] Mar. 22, 1977

[54] BINOCULAR

[76] Inventors: Tetsuro Mukai, 1-26, Nishi, Kawaguchi, Saitama; Yoshiro Mukai, 2-5-5 Gotokiji, Setagaya, Tokyo, both of Japan

[22] Filed: May 22, 1975

[21] Appl. No.: 580,128

[30] Foreign Application Priority Data

June 1, 1974 Japan .............................. 49-62394

[52] U.S. Cl. .................................. 350/36; 350/46; 350/51; 350/76
[51] Int. Cl.² .......................................... G02B 23/02
[58] Field of Search .......................... 350/36, 72–77, 350/51, 46, 47

[56] References Cited

UNITED STATES PATENTS

| | | | |
|---|---|---|---|
| 2,032,676 | 3/1936 | Warmisham | 350/36 |
| 2,079,890 | 5/1937 | Wollensak et al. | 350/75 |
| 2,124,157 | 7/1938 | Trautmann | 350/77 |
| 2,534,776 | 12/1950 | Kershaw et al. | 350/77 |
| 2,940,359 | 6/1960 | Rantsch | 350/36 |
| 2,942,519 | 6/1960 | Boughton et al. | 350/36 |
| 3,814,496 | 6/1974 | Mukai | 350/75 |

*Primary Examiner*—David H. Rubin
*Attorney, Agent, or Firm*—Fred Philpitt

[57] ABSTRACT

A binocular comprising a bedplate provided with a pair of left and right objective lenses, a support frame standing on the bedplate, and a casing detachably attached to the bedplate in such a manner to cover the support frame. All of the optical members except the objective lenses are mounted on the support frame so that each of the optical members may easily be inspected and adjusted by removing the casing. The interval between the left eyepiece and the right eyepiece may be adjusted to the interval of the user's own eyes by moving one of the eyepiece members on either side, wherefore rectangularly shaped objective lenses which are deemed to be most suitable from a human engineering point of view to the visual angle of a human being's eyes to obtain a clean and wide view can be utilized.

8 Claims, 10 Drawing Figures

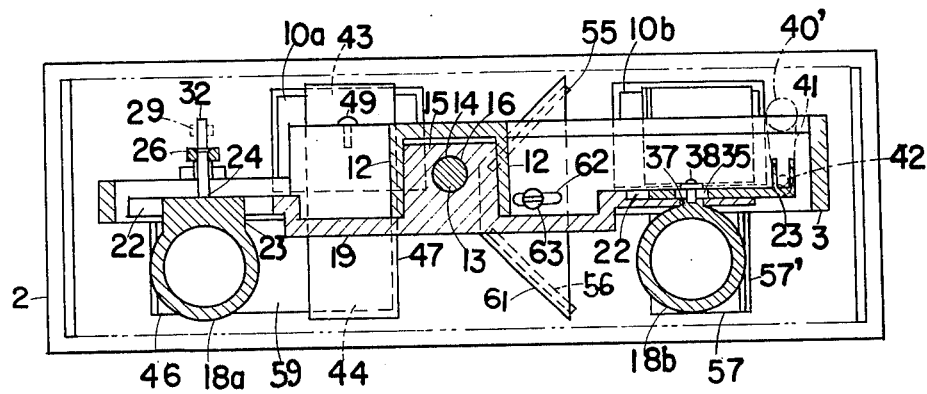
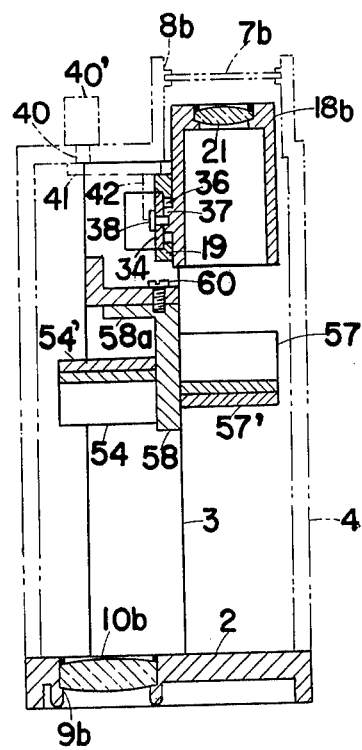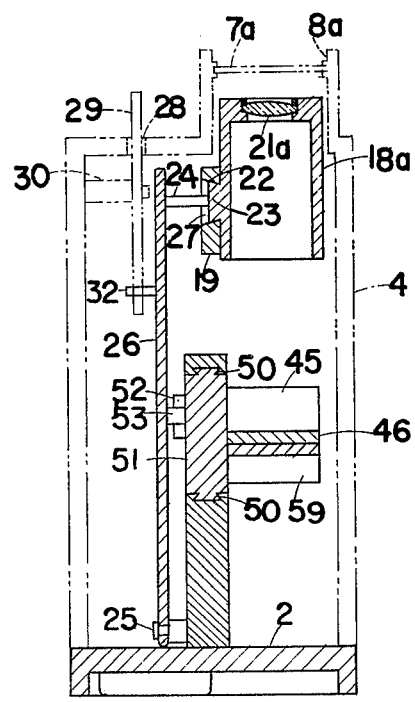

BINOCULAR

The present invention relates to a binocular which is unique in its construction in comparison with the known binocular having cylindrical bodytubes.

In the known binocular, all of the optical members such as objective lenses, prisms for obtaining erect image, eyepieces etc. are installed in each of the bodytubes. This type of binocular has drawbacks in that in the case where the optical members are found to be out of order, the bodytubes will have to be disassembled to inspect and adjust the optical members, inspecting and adjusting operation being very difficult even by an expert in the field to say nothing of a non-professional.

Accordingly, it is an object of the present invention to provide a binocular which comprises a bedplate provided with a pair of objective lenses, a support frame standing on the bedplate, and a casing detachably attached to the bedplate in a manner to cover the support frame, all of the optical members except the objective lenses, such as eyepieces, reflection member for obtaining erect image etc. being attached to the frame member, whereby the optical members when they are found to be out of order can be dexterously inspected and adjusted by removing the casing from the bedplate.

Another object of the present invention is to provide a binocular wherein one of the eyepieces is designed to move on either side so that interval between the eyepieces may be adjusted to the interval of the user's own eyes and utilization of rectangularly shaped objective lenses that was not possible in the known binocular having bodytubes connected with each other by means of a bridge member may be reduced into practice to obtain a rectangular view which is deemed to be most suitable from a human engineering point of view to obtain clear and wide view.

A further object of the present invention is to provide an interlocking mechanism wherein when one of the eyepiece tubes movable on both sides is caused to move on either side, optical reflection member is concurrently moved in such a manner that the optical axis thereof always corresponds with the center axis of the eyepiece tube.

A still further object of the present invention is to provide binocular wherein the adjustment of visibility may be carried out either by moving both of the eyepiece tubes axially and simultaneously or by moving only one of the eyepieces independently of the other.

Yet another object of the present invention is to provide a binocular wherein up and down split of of the image, right and left split of the image, or the focal distance can easily be adjusted either by rotating the optical reflection members or by moving them horizontally.

The nature of the present invention will become more fully apparent from a consideration of the following description of an exemplary embodiment thereof, taken in conjunction with the accompanying drawings, in which:

FIG. 5 is a transverse section taken along the line V — V of FIG. 4;

FIG. 6 is a longitudinal section taken along the line VI — VI of FIG. 4;

FIG. 7 is a longitudinal section taken along the line VII — VII of FIG. 4;

Figure 1:
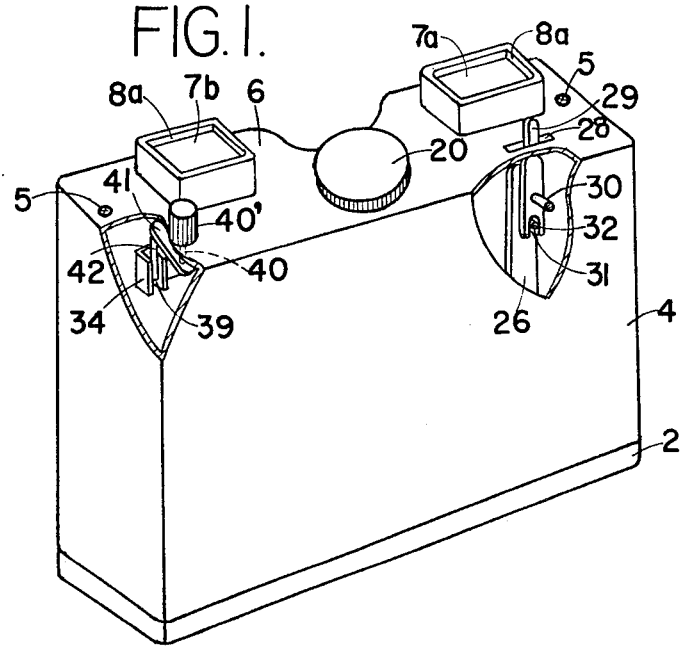
FIG. 1 is an oblique view, partially in section, as seen from the backside thereof, of the binocular according to the present invention.
Figure 2:
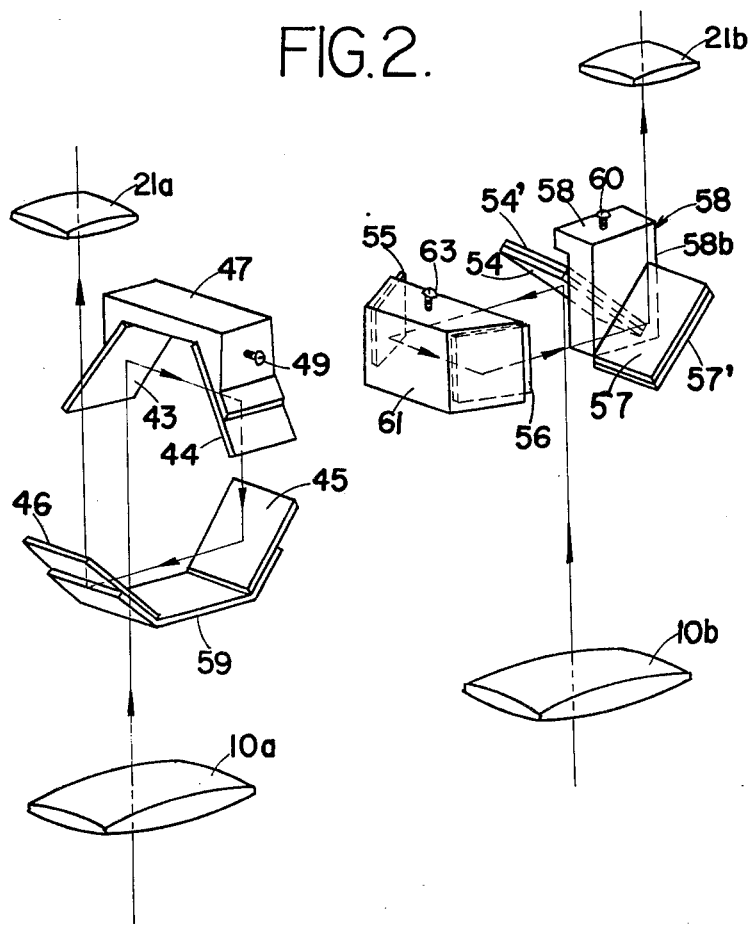
FIG. 2 is an optical flow sheet to illustrate how the optical members are arranged.
Figure 3:
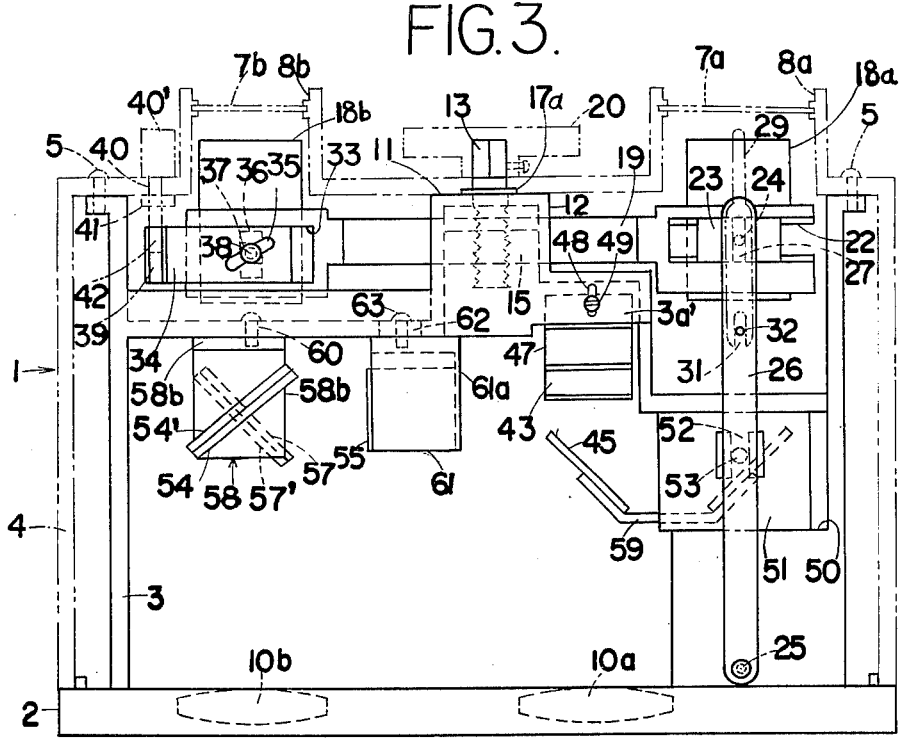
FIG. 3 is a front view of the binocular with its casing removed.
Figure 4:
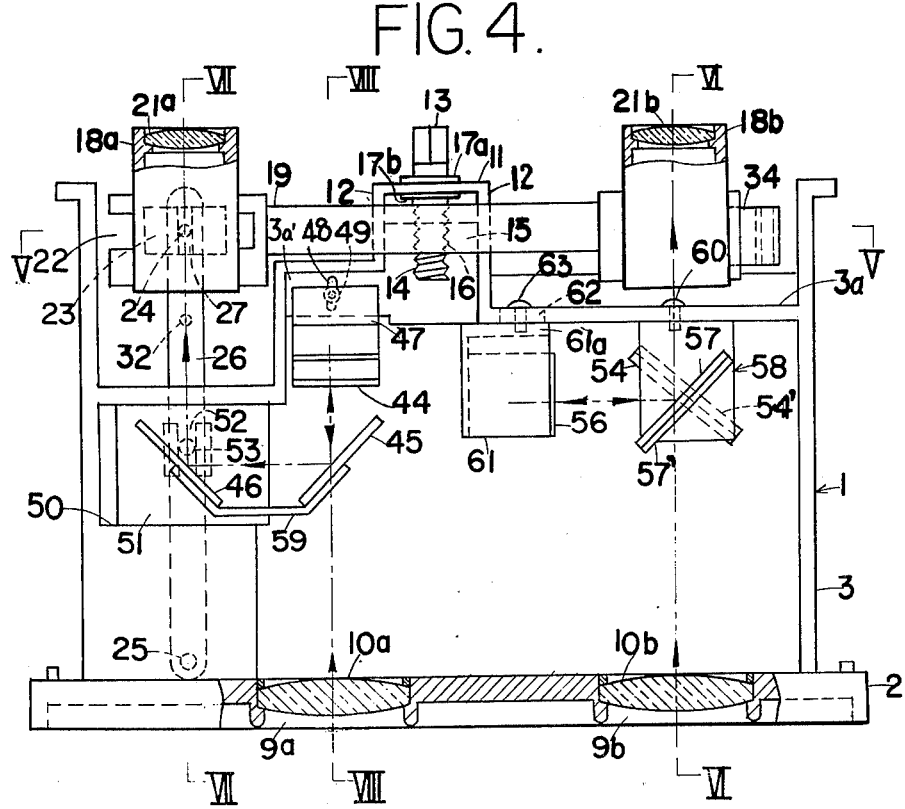
FIG. 4 is a rear view of the binocular also with its casing removed.
Figure 8:
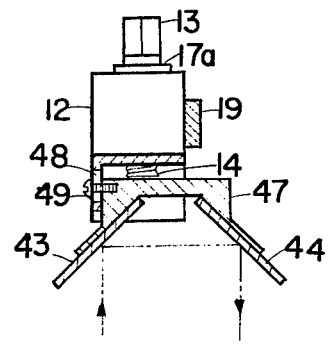
FIG. 8 is a longitudinal section taken along the line VIII — VIII of FIG. 4.
Figure 9:
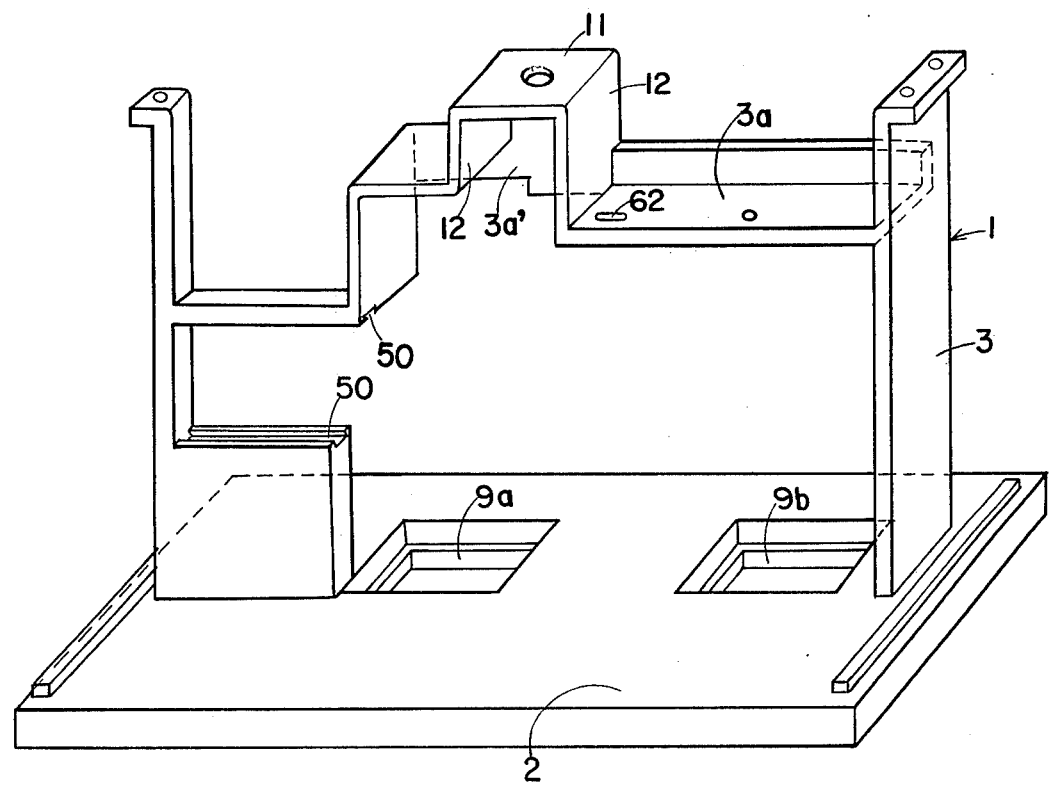
FIG. 9 is an oblique view of the frame member.

In the drawings, reference numeral 1 designates generally a frame member in which all kinds of optical members are to be installed, said frame member consisting of a bedplate 2 and a support frame 3. Designated by reference numeral 4 is a square casing provided with a top portion but not provided with a bottom portion, the top portion being designated by the reference numeral 6. This square casing 4 is designed to be put on the support frame 3 and detachably mounted on the frame member 1 by means of a screw 5 or the like. The top portion 6 of the casing 4 is provided with a pair of eyelet holes 8a, 8b each of which is covered by a dust-proof glass 7a and 7b. The bedplate 2 of the frame member 1 is provided with a pair of lens holes 9a, 9b to accommodate objective lenses 10a, 10b whilst the rear side of the frame member 1 is provided with an upper plate 11 horizontally supported by two vertically extending guide ribs 12, 12. Lower portion of a male screw 14 of a vertically adjustable shaft 13 which is installed through the utilization of the upper plate 11 is screwed into a vertically extending female screw 16 of a lift screw 15 provided between the guide ribs 12 and 12, said vertically adjustable shaft 13 being provided with a pair of collars 17a, 17b to nip the upper plate 11 therebetween so that the axial movement thereof may be prevented.

A bar 19 provided with a pair of eyepiece tubes 18a, 18b is integrally mounted at its middle portion on the rear side of the lift screw 15. Accordingly, when a grip which is designated by the reference numeral 20 and is detachably mounted on the upper end of the vertically adjustable shaft 13 is rotated clockwisely or counterclockwise, the pair of eyepiece tubes 18a 18b are concurrently moved upwardly and downwardly whereby the visibility may be adjusted. In this connection, it is to be seen that eyepieces are designated by reference numerals 21a and 21b.

One of the eyepiece tubes i.e. the left eyepiece tube 18a is designed to move on either side so that the interval between the eyepiece tubes may be adjusted in accordance with the interval of the user's own eyes. Detailed explanation of such mechanism will follow.

The left end portion of the bar 19 includes an oblong guide slot 22, into which a slider 23 of the left eyepiece tube 18a is fixed. The rear side of the slider 23 is provided with a longitudinal groove 27 which groove is adapted to receive a pin 24 projecting rearwardly of a lever 26 the lower portion of which is pivotally connected, by means of a shaft 25, to the bearing portion of the bedplate 2 or the support frame 3.

In the inside of the casing 4, there is provided an operation lever 29 which is movably installed by means of a shaft 30, the upper end portion of the lever 29 extending upwardly through a slot 28 provided on the top plate of the casing 4. The lower portion of the operation lever 29 includes a split 31 which split is designed to engage with a pin 32 projecting from an appropriate portion of the lever 26. Thus, when the operation lever 29 is inclined on either side, the left eyepiece tube 18a is moved rightwardly or leftwardly.

The right eyepiece tube 18b is not slidable rightwardly or leftwardly but is axially movable i. e. movable upwardly or downwardly to adjust the visibility. Detailed explanation of such mechanism will be as follows.

The rear side of the right end portion of the bar 19 includes an oblong slide groove 33 adapted to receive a transverse slider 34. This transverse slider 34 is provided with a non-horizontal oblique slot 35. The right end portion of the bar 19 is further provided with a guide slot 36 which meets at right angles the oblong slide groove 33, said guide slot 36 being adapted to receive a longitudinal slider 37. The rear end of this longitudinal slider 37 is provided with a pin 38 which is designed to be in contact with the oblique slot 35 of the transverse slider 34.

The rear side of the right end portion of the transverse slider 34 is provided with a groove 39 whilst a free end pin 42 extending downwardly from a lever 41 mounted on the inside of the top portion of the casing by means of a vertical operation shaft 40 is made to contact with the groove 39 of the transverse slider 34. Accordingly, the axial movement of the right eyepiece tube 18b to adjust the visibility may be accomplished by the clockwise or counterclockwise rotation of a grip 40' which is at the upper portion of the operation shaft 40.

The light passing through the left objective lens 10a is firstly reflected rightwardly at a right angle from the first mirror 43 to the second mirror 44, reflected downwardly therefrom at a right angle to the third mirror 45, reflected leftwardly therefrom at a right angle to the fourth mirror 46, reflected further upwardly therefrom at a right angle and finally allowed to enter into the left eyepiece 21a. It is to be noted that the first mirror 43 and the second mirror 44 are mounted on the same frame member 47 which is fixed by means of a screw 49 passing through a longitudinal slot 48 provided on a rib 3a' of the upper portion of the support frame 3 so that the vertical movement of the frame member 47 can be accomplished by loosening the screw 49, rightward and leftward movement of the optical axis for the left eye being adjusted by letting the frame member 47 move around the screw 49.

The third mirror 45 and the fourth mirror 46 are mounted on a frame member 59 which is set up on the front surface of a transverse slider 51 fixed into a transverse slide groove 50 formed on the left side front of the support frame 3. A longitudinal groove 52 formed on the front surface of the transverse slider 51 is designed to be in contact with a pin 53 extending from the rear surface of the lever 23, so that when the lever 26 is moved obliquely, the transverse slider 51 may be slid on either side interlockingly with the left eyepiece tube 18a. In this connection, it is to be noted that the right and left movement of the transverse slider 51 will not exceed one half of the movement of the left eyepiece tube 18a. This is because of the position of the pin 53 which is installed in the center of the lever 26 i. e. between the shaft 25 and the pin 24.

The light passing through the right objective lens 10b comes firstly at a right angle with respect to the first mirror 54. The light so entered into the first mirror 56 is then reflected leftwardly at a right angle therefrom to the second mirror 55, reflected further therefrom rearwardly at a right angle to the third mirror 56, reflected further therefrom rightwardly at a right angle to the fourth mirror 57, reflected further therefrom upwardly at a right angle and finally allowed to enter into right eyepiece 21b.

In this connection, it will be noted that the first mirror 54 and the fourth mirror 57 are mounted respectively on webs 54' and 57' provided on both sides of a vertical member 58a of a frame member 58 having a horizontal member 58a in addition to said vertical member 58b. The horizontal member 58a of the frame member 58 is connected to the support frame 3 by means of a vertical screw 60 which is designed to pass through an upper plate 3a of the support frame 3.

The second mirror 55 and the third mirror 56 are mounted on a frame member 61 of which an upper plate 61a is connected to the underside of the upper plate 3a by means of a screw 63 designed to pass through a transverse slot 62 penetrating vertically the upper plate 3a of the support frame 3, so that the focal distance adjustment of the right optical system may be accomplished by loosening the screw 63 on either side.

As will be understood from the above explanation, it is possible through utilization of the binocular according to the present invention that the user suitably adjusts the interval between the left eyepiece tube 18a and the right eyepiece tube 18b to the interval of his own eyes by moving the left eyepiece tube 18a on either side through rotating the operation lever 29 at his will and that the user adjusts the visibility of the left and right eyepieces 21a, 21b by moving the bar 19 upwardly or downwardly through rotating the grip 20 on either side. It is also possible that when the visibility of both of the eyepieces does not coincide with each other, the user firstly adjusts the visibility of the left eyepiece 21a through the operation of the grip 20 and then rotates the grip 40' on either side to move the right eyepiece tube 18b upwardly or downwardly.

Since all of the reflecting mirrors are attached to the support frame 3 of the optical frame member 1, they can be easily inspected by removing the casing 4. In the case where it is found that the reflecting mirrors are not properly set, they can be easily adjusted by removing the casing from the frame member 1. Typical examples for utilizing such convenient mechanism will be as follows.

In case where the image is split on both sides, the frame member 47 is moved to rotate around the screw 49 on either side whereby the image on the left optical system is caused to move to coincide with the other image.

In case where the image is split up and down, the frame member 58 is moved to rotate around the vertical screw 60 on either side or the frame member 61 is rotated around the screw 63 whereby the image on the right optical system is caused to move upwardly or downwardly to coincide with the other image.

The focal distance adjustment of the left objective lens 10a can be accomplished by moving up and down the frame member 47 via the longitudinal slot 48 whilst the focal distance adjustment of the right objective lens 10b can be accomplished by moving the frame member 61 on either side via the transverse slot 62.

As will be understood from the above explanation, the binocular according to the present invention has no bodytubes which are employed in the conventional binocular, and all of the optical members are mounted on the frame member 1 to which the casing 4 is detachably attached. The adjustment of mirrors in the conventional binocular is deemed to be hardly possible even by an expert in the field because of its peculiar construction. In the binocular of this invention, however, the adjustment of mirrors when they are found to be out of order can easily be made even by a non-professional user through removing simply the casing 4. Such construction of the binocular according to the present invention is advantageous in that it can dexterously be assembled in a factory even by an unskilled worker, as a result of which the work efficiency will greatly be increased.

Since the interval between the left eyepiece tube and the right eyepiece tube according to the present invention is designed to be adjusted by moving horizontally one of the eyepiece tubes, it is possible that all of the optical members be attached to the frame member provided with the detachable casing and that the objective lens be of rectangular shape, one side thereof being set in the ratio of 3:2 with respect to the other side, which is most suitable from a human engineering point of view to the visual angle of a human being's eyes in order to obtain a clear and wide view that can not be obtained by the conventional binocular wherein both bodytubes are connected with each other by means of a bridge member.

Figure 10:
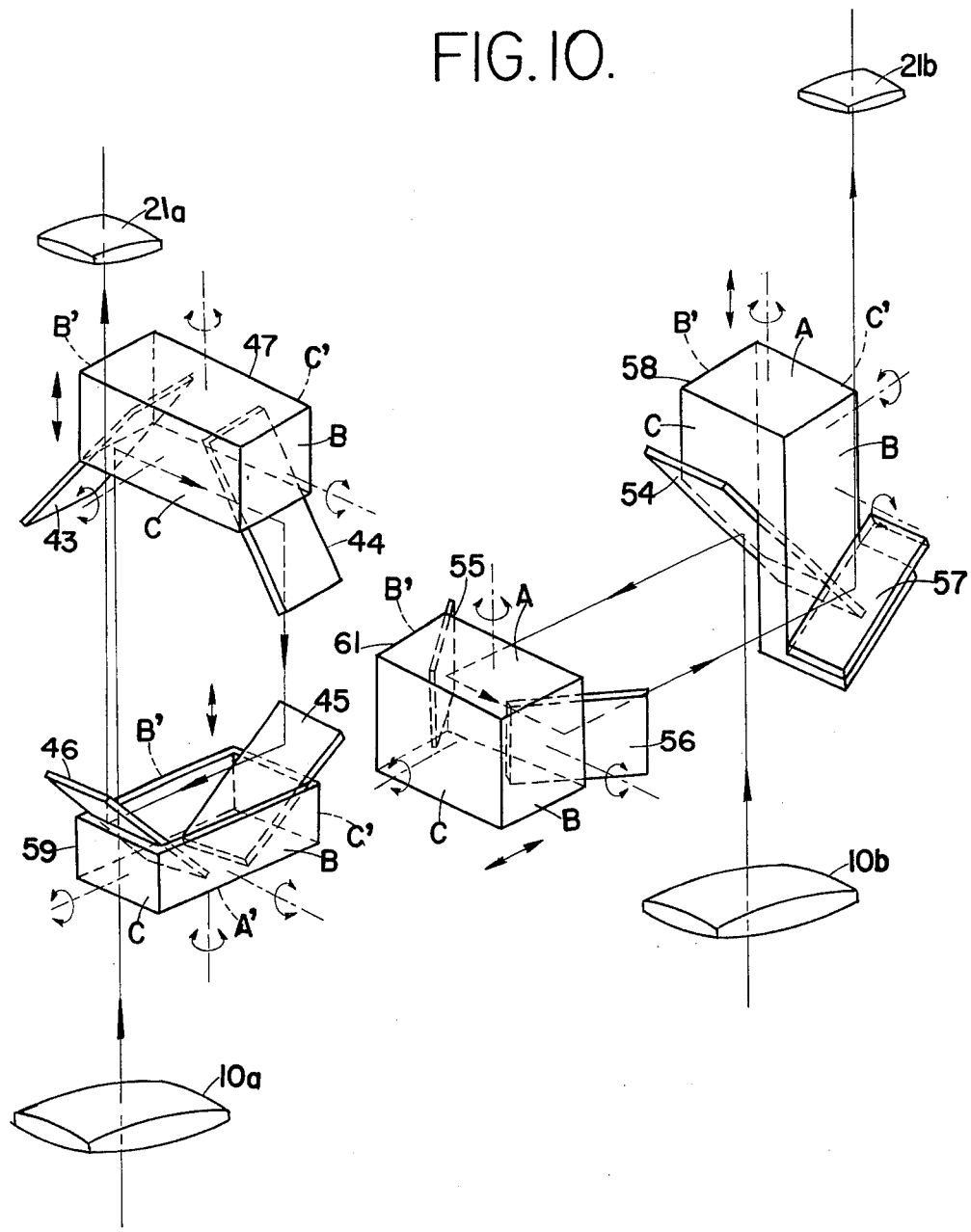
FIG. 10 shows an oblique view of a modified optical system.

Reference will now be made to FIG. 10 wherein another embodiment of the present invention is shown. Adjustment of both optical systems will be carried out as follows.

In case where the image is split on both sides, any one of the frame members 47, 58, 59, 61 is moved to rotate around the axes, each extending perpendicularly to the flat portions B - B' of each of the frame members, whereby the image appearing in the left optical system or in the right optical system is caused to move on either side.

In case where the image is split up and down, one of the frame members 47 or 59 of the left optical system is moved to rotate clockwisely or counterclockwise around the axis which is extending perpendicularly to the flat portions C-C' of each of the frame members, or one of the frame members 58 or 61 of the right optical system is moved to rotate clockwisely or counterclockwise around the axes, each extending perpendicularly to the flat portions A-A' of each of the flat members, whereby either one of the images appearing in the right optical system or in the left optical system is caused to move upwardly or downwardly.

In case where the image is inclined, one of the frame members 47, 59 of the left optical system is caused to move clockwisely or counterclockwise around the axis which is extending perpendicularly to the flat portions A, A' of each of the frame members, or one of the frame members 58, 61 of the right optical system is caused to move clockwisely or counterclockwise around the axis which is extending perpendicularly to the flat portions C, C' of each of the frame members, whereby the image appearing in the left optical system or in the right optical system is inclined.

In case where the focal distance adjustment regarding the left optical system is found to be necessary, one of the frame members 47, 59 is moved upwardly or downwardly.

In case where the focal distance adjustment regarding the right optical system is found to be necessary, the frame member 58 is moved upwardly or downwardly or the frame member 61 is moved on either side.

While a particular embodiment of the present invention has been shown and described, it will be obvious to those skilled in the art that changes and modifications may be made without departing from the invention in its broader aspects and, therefore, the aim in the appended claims is to cover all such changes and modifications as fall within the true spirit and scope of this invention.

What is claimed is:

1. A binocular comprising:
   a. a bedplate having a pair of holes adapted to receive a pair of objective lenses,
   b. a support frame standing on said plate that is provided with optical members adapted to guide the light passing through said objective lenses into each of eyepieces,
   c. a casing provided with a pair of openings at its top portion to accommodate said eyepieces and detachably attached to said bedplate in a manner to cover said support frame,
   d. a lift nut installed within a cylindrical guide formed in the upper portion of said support frame, said cylindrical guide having a lengthwise opening in its side and being provided with a top portion, said lift nut being screwed onto the external thread of a lower portion of an adjustable shaft and the upper end thereof extending upwardly through a hole formed in said top portion of said casing in such a manner that it may be moved upwardly or downwardly by the clockwise or counterclockwise rotatative movement of said adjustable shaft,
   e. a horizontal lift bar extending from said opening of said cylindrical guide, the center portion of said horizontal lift bar being attached to said lift nut,
   f. an eyepiece tube attached to one end of said horizontal lift bar,
   g. a slider fitted into a transverse groove formed in the other end of said horizontal lift bar and having an oblique slot said slider being designed to move on either side by the clockwise or counterclockwise rotatative movement of a manual member provided on the outside of said casing, and
   h. an eyepiece tube having a pin extending from its side portion and designed to move upwardly or downwardly by the movement of said slider on either side, said pin being inserted into an intersecting point between said oblique slot of said slider and a longitudinal slot provided in said other end of said lift bar.

2. A binocular as set forth in claim 1 comprising a slider actuating mechanism wherein a longitudinal groove is formed in said slider and a pin extending downwardly from said horizontal lever firmly fixed to the lower end of a rotatable shaft passing through said top plate of said casing is designed to engage with said longitudinal groove.

3. A binocular comprising:
   a. a bedplate having a pair of holes adapted to receive a pair of objective lenses,
   b. a support frame standing on said bedplate,
   c. a casing having a pair of eyepiece holes at its top plate portion, being detachably attached to said bedplate in a manner to cover said support frame,
   d. a nut installed within a cylindrical guide formed in the upper portion of said support frame, said cylindrical guide having a lengthwise opening at its side and being provided with a top portion, said nut being secured onto the external thread of a lower portion of an adjustable shaft extending upwardly through a hole formed in said top portion of said casing as well as a hole formed in said top portion of said cylindrical guide in such a manner that it may be moved upwardly or downwardly by the clockwise or counterclockwise rotatative movement of said adjustable shaft, e. a horizontal lift bar extending from said opening of said cylindrical guide, the center portion of said horizontal lift bar being attached to said nut, f. a right slider fitted into a transverse groove formed in the right end portion of said horizontal lift bar and having an oblique slot, said slider being designed to move on either side by the clockwise or counterclockwise rotatative movement of a manual member provided on the outside of said casing, g. a right eyepiece tube having a pin extending from its side portion and designed to move upwardly or downwardly by the movement of said slider on either side, said pin being inserted into an intersecting point between said oblique slot of said slider and a longitudinal slot provided in said right end of said lift bar, h. a left eyepiece tube attached to a left slider which is fixed into a transverse slot formed in the left end portion of said horizontal lift bar, i. a first reflecting member and a second reflecting member of the left optical system, whereby light passing through the left objective lens is firstly reflected horizontally at the angle of 90° and then reflected downwardly, j. a third reflecting member and a fourth reflecting member of the left optical system, both being fixed to a reflecting member support slider which is attached to said support frame so as to be slidable on either side, whereby the light coming from said second reflecting member of said left optical system is firstly reflected horizontally, reflected further upwardly and then allowed to enter into the left eyepiece tube, k. an interlocking lever movably attached to a bearing on said bedplate by means of a horizontal shaft and having a horizontal pin extending vertically from the middle portion thereof and another horizontal pin extending vertically from the upper portion thereof, one of said horizontal pins being in contact with a longitudinal groove formed in said slider adapted to attach thereto said third and fourth reflecting members and other one of said horizontal pins being in contact with a longitudinal groove formed in said slider adapted to attach thereto said left eyepiece tube, l. a manual lever movably attached to the inside surface of said casing, the upper portion thereof extending exteriorly through the slot provided in the top plate of said casing and the fork end portion i. e. the lower portion thereof being in contact with said upper horizontal pin of said interlocking lever, and m. a first reflecting member, a second reflecting member, a third reflecting member and a fourth reflecting member of the right optical system, all being fixed to said support frame, whereby the light coming through the right objective lens is firstly reflected horizontally at the angle of 90°, reflected consecutively in the same plane at the same angle of 90°, reflected further upwardly and finally allowed to enter into the right eyepiece tube.

4. A binocular as set forth in claim 3 wherein said first reflecting member and said second reflecting member in said left optical system are provided in said reflecting member support frame member attached to said support frame in such a manner that both of said reflecting members may be rotated and adjusted around the horizontal axis which runs parallel with the vertical elevation including each of the optical axes of the light reflected by said first and second reflecting members.

5. A binocular as set forth in claim 3 wherein said second reflecting member and said third reflecting member are provided in said reflecting member support frame member attached to said support frame in such a manner that both of said second and third reflecting members may be moved on either side.

6. A binocular as set forth in claim 5 wherein said reflecting member support frame member is attached to said support frame in such a manner that it may be moved around the vertical axis.

7. A binocular as set forth in claim 3 wherein said first reflecting member and said fourth reflecting member in said right optical system are provided in said reflecting member support frame member attached to said support frame in such a manner that both of said reflecting members may be rotatable around the vertical axis.

8. A binocular as set forth in claim 7 wherein said reflecting member support frame member is attached to said support frame in such a manner that it may be movable and adjustable on either side.

* * * * *